Sept. 6, 1938.  D. E. RUTISHAUSER  2,129,072
REFRIGERATOR
Filed March 27, 1936
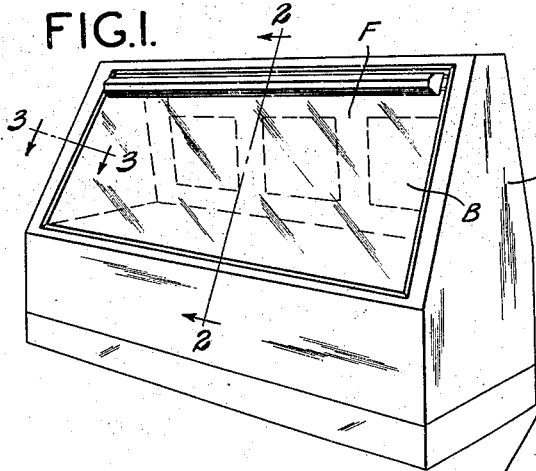
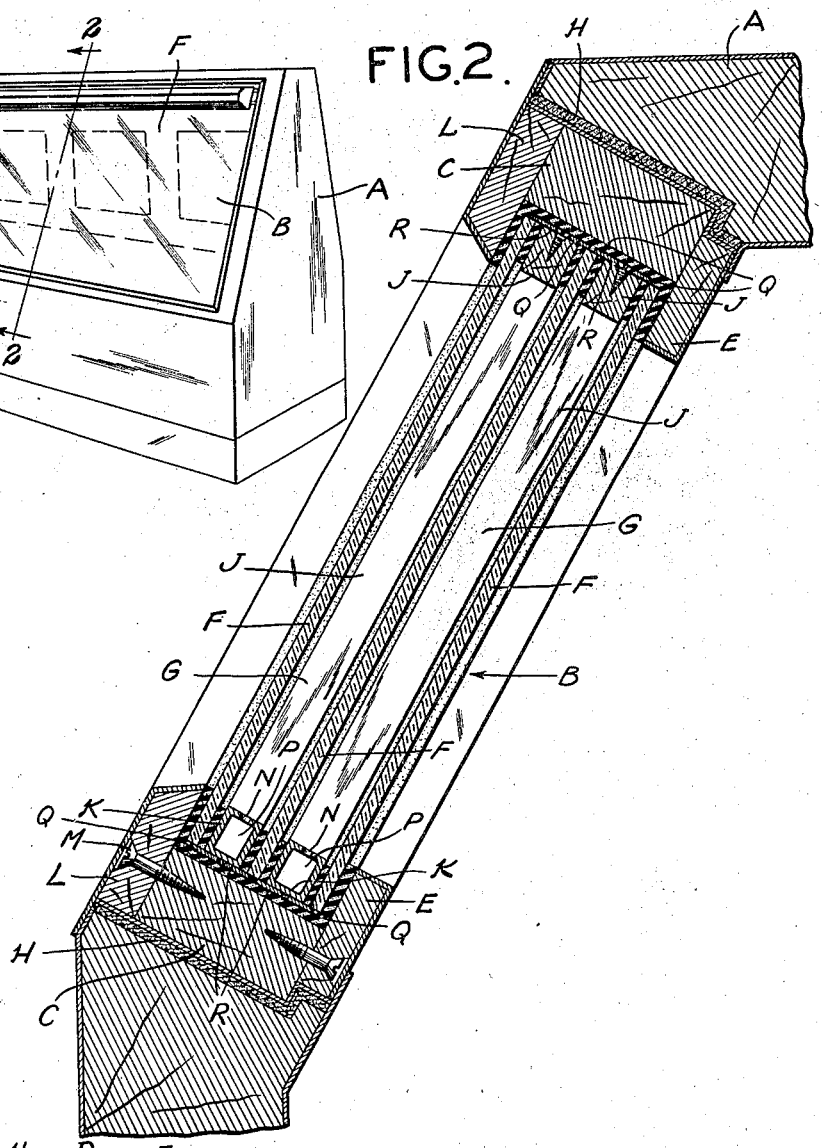
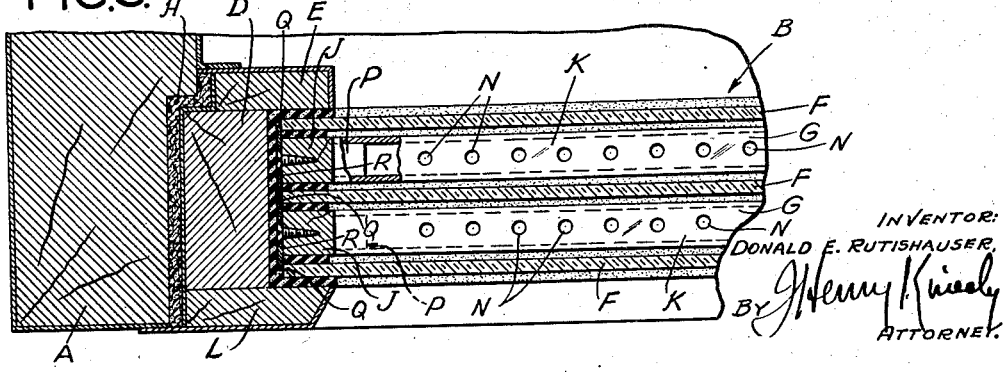
INVENTOR:
DONALD E. RUTISHAUSER,
BY
ATTORNEY.

Patented Sept. 6, 1938

2,129,072

UNITED STATES PATENT OFFICE 2,129,072

REFRIGERATOR

Donald E. Rutishauser, Chicago, Ill., assignor to Zero Plate Corporation, Chicago, Ill., a corporation of Delaware Application March 27, 1936, Serial No. 71,265

4 Claims. (Cl. 20—56.5)

My invention relates to refrigerators and more particularly to refrigerators having included in a wall thereof a transparent panel through which the interior of the refrigerator and its contents may be viewed. Usually, so that a minimum of heat exchange will be had between the exterior and interior of the refrigerator, such transparent panels are formed by a plurality of transparent plates separated to form one or more dead air spaces therebetween and spaced apart by spacing strips arranged between adjacent plates and, secured, as by screws, to the frame of the panel.

In forming these panels the inside glass plate was set in an opening left in the refrigerator wall, a spacing strip was securely fastened to the frame against each of the marginal edges of the plate, another plate was placed on the outer side of the spacing strip and this procedure was repeated until the desired number of plates had been mounted in the panel. Then face plates were drawn by screws, bolts or some other expedient to the panel adjacent the marginal surfaces of the outer plate. These face plates were intended to firmly hold the edges of the plates against the spacing strips. However, because the spacing strips were each secured to the frame of the panel proper pressure might be obtained by tightening the facing strip to hold the outermost plate firmly against the outermost spacing strips, but such pressure had no effect upon the other plates. Consequently, no adequate seal was obtained between the innermost plates and their spacing strips.

Also, due to the difference in temperature between their outer and inner surfaces, because of the moisture content of the air and as a result of other causes, condensation forms on the surfaces of these glass plates and causes a fogging on the inner surfaces thereof of the plates.

Heretofore, to obviate this fogging and to remove the moisture from the dead air spaces, hydroscopic agents of various kinds and types have been included between the glass plates of the transparent panels. Sometimes such agents were placed in containers fixed between the plates and in plain view of anyone looking therethrough. In other structures, a pocket or recess containing the agent has been formed adjacent the panel and slots or openings have been formed through the panel frame, so that air from the spaces between the plates could have free access to the agent.

Furthermore, these transparent panels have been built up in the wall of the refrigerator during construction thereof. That is to say, an opening was left in the wall and the transparent plates and the spacing strips were mounted part by part in the opening. If during handling or use of the refrigerator, one of the transparent plates became broken it was necessary to send a mechanic to the place where the refrigerator was situated and have him take the transparent panel apart and then remount the parts after the broken plate had been replaced.

The objects of this invention are to provide a convenient, efficient and sightly container for a hydroscopic agent in a transparent panel of a refrigerator and to provide a transparent panel for such use, which panel will provide a pressure engagement between the plates and spacing strips and which panel may be built up as a unit away from the refrigerator proper and then may be inserted quickly and easily in an opening left therefor in a wall of the case.

In the accompanying drawing, wherein similar characters are used to designate similar parts, I have shown one embodiment of my invention. Fig. 1 is a perspective view of a refrigerated display counter as embodying my new and improved construction; Fig. 2 is a section of a part of the front wall of the case along the lines 2—2 in Fig. 1; and Fig. 3 is a cross section along the lines 3—3 in Fig. 1.

Referring to the figures in the embodiment shown, the refrigerator A has mounted in the front wall thereof a transparent panel B which consists of an enclosing frame comprising longitudinal members C and vertical members D joined at their meeting points by any suitable expedient and arranged to form at the inner sides thereof a continuous shoulder E. The panel also includes a plurality of glass plates F spaced apart, by means hereinafter described, to form a plurality of dead air spaces G.

Preferably, the outer edges of the frame of the panel as formed by the members C and D are arranged in two planes, as shown in Figs. 2 and 3, so that when the panel is set in an opening in the refrigerator wall with the inner edges of the opening formed to follow the contour of the outer edges of the frame, a tight, efficient seal between the wall of the refrigerator and the panel will be formed. Usually, it is desirable to include a body of felt or sheep's wool, as indicated at H, between the meeting surfaces of the wall and the panel.

The transparent panel B in the form shown may be assembled at any convenient place and then may be inserted in the wall of the completed refrigerator when desired. The plates F are set within the frame formed by the members C and D with the inside plate resting against the shoulder E. The plates are maintained in predetermined spaced relation by suitable spacing strips J, preferably of wood, at the top and sides of the panel, and by hollow spacing strips K at the bottom of the panel. These spacing strips are provided with flanges Q at their sides next to the frame and these flanges are adapted to engage an edge of the transparent plates held apart by the strip. The flanges Q may be formed by any suitable expedient but in the embodiment shown they are formed by metal strips R fastened to the spacing strips J by screws and to the metal spacing strips K by welding, all as shown in the figures. The spaces between the plates and the frame and between the plates and the spacing strips, preferably, as shown in the figures, are filled with plastic rubber or other plastic, resilient material and after the parts have been positioned in place face plates L are attached firmly in place as by screws M and a squeezing pressure exerted thereby upon the plates and, in turn, upon the plastic rubber, so that this material will be distributed to fill up all cracks and crevices between the parts. The spacing strips will be prevented from moving away from the panel frame by the flanges Q and the parts will be maintained in proper position by the pressure created when the face plates L are fixed to the frame and an effective seal will be maintained between the parts.

Plastic rubber, of putty-like consistency, is the best sealing substance for use at the points indicated because it will not set and become hard as will putty or cement and will retain its initial resiliency. Therefore, vibrations and shocks incidental to normal handling will be absorbed and breakage of the parts of the panel will be minimized.

In the embodiment shown, the spacing strips K are formed from a hollow rectangular tube, preferably of non-corrosive metal. The upper wall of each strip K is provided with openings therethrough, such as the perforations N shown in the figures, whereby air from the spaces G between the plates may have access to the hollow interior of the strips. The interiors of the strips are filled with a suitable hydroscopic agent and the ends may be plugged, as indicated at P, in Fig. 3. A hydroscopic agent of any of the usual types may be used, but I have found that a preparation combining silica jell and calcium chloride is adapted particularly to use with my device.

Obviously, the air in each of the spaces G will have access to the hydroscopic agent in the hollow interior of a spacing strip K and this air will be maintained dry at all times, whereby fogging of the inner surfaces of the transparent plates will be obviated. Also, since the receptacle for the hydroscopic agent is formed in a spacing strip, such receptacle will be out of sight and its formation will not necessitate cutting or impairing the frame of the panel.

I have shown one embodiment only of my invention in the accompanying drawing, but it should be understood clearly that the size, shape, form and arrangement of the parts may be varied within wide limits without deviating from the spirit of my invention as included in the appended claims. For instance, although I have found that it is best to have the hydroscopic agent at the lower side or edge of the air spaces G, in other forms and embodiments of refrigerators, one of the other spacing strips, such as a side or top strip, may be formed and arranged to contain the hydroscopic agent. Also, only portions of a spacing strip may be hollowed or otherwise formed to provide a receptacle for the agent. Similarly, the number of plates used and the form and shape of the frame for the transparent plates may be varied without deviating from the ambit of my invention.

What I claim as new and desire to secure by Letters Patent, is:

1. In a refrigerator, a transparent panel comprising a plurality of transparent plates spaced apart to provide a dead air space between adjacent plates, spacing strips between adjacent surfaces of adjacent plates, said strips having thereon means to prevent movement thereof relative to said transparent plates, face plates adapted to be drawn against the marginal surfaces of the outermost of said transparent plates, and said spacing strips being unattached to the frame of said panel whereby when said face plates are drawn against said outermost transparent plate the pressure created thereby will be exerted upon the marginal surfaces of all of said transparent plates and upon all of said spacing strips so that an effective seal between said parts will be maintained.

2. In a refrigerator, a transparent panel comprising a plurality of transparent plates spaced apart to provide a dead air space between adjacent plates, spacing strips between adjacent surfaces of adjacent plates, means carried by each of said spacing strips and arranged to engage the outer edge of the transparent plate contiguous to said strip, face plates adapted to be drawn against the marginal surfaces of the outermost of said transparent plates and said spacing strips being unattached to the frame of said panel whereby when said face plates are drawn against said outermost transparent plates the squeezing pressure created thereby will be exerted upon the marginal surfaces of all of said transparent plates and upon all of said spacing strips and upon the sealing material therebetween so that an effective seal between said parts will be maintained.

3. In a refrigerator, a transparent panel comprising a plurality of transparent plates spaced apart to provide a dead air space between adjacent plates, spacing strips between adjacent surfaces of adjacent plates, face plates adapted to be drawn against the marginal surfaces of the outermost of said transparent plates, a resilient material arranged between the contiguous parts of said plates and said spacing strips, and said spacing strips being unattached to the frame of said panel whereby when said face plates are drawn against said outermost transparent plate the squeezing pressure created thereby will be exerted upon the marginal surfaces of all of said transparent plates and upon all of said spacing strips and upon the sealing material therebetween so that an effective seal between said parts will be maintained.

4. In a refrigerator, a transparent panel comprising a plurality of transparent plates spaced apart to provide a dead air space between adjacent plates, spacing strips between adjacent surfaces of adjacent plates, means carried by each of said spacing strips and arranged to engage the outer edge of the transparent plate contiguous to said strip, face plates adapted to be drawn against the marginal surfaces of the outermost of said transparent plates, a resilient material arranged between the contiguous parts of said plates and said spacing strips, and said spacing strips being unattached to the frame of said panel whereby when said face plates are drawn against said outermost transparent plates the squeezing pressure created thereby will be exerted upon the marginal surfaces of all of said transparent plates and upon all of said spacing strips and upon the sealing material therebetween so that an effective seal between said parts will be maintained.

DONALD E. RUTISHAUSER.